United States Patent
Yoon

(10) Patent No.: US 6,581,224 B2
(45) Date of Patent: Jun. 24, 2003

(54) BED HEATING SYSTEMS

(76) Inventor: Hyun Yoon, 1304 - 4960 Sanders Street, Burnaby, BC (CA), V5H 1S9

( * ) Notice: Subject to any disclaimer, the term of this patent is extended or adjusted under 35 U.S.C. 154(b) by 0 days.

(21) Appl. No.: 09/798,888

(22) Filed: Mar. 6, 2001

(65) Prior Publication Data

US 2002/0124312 A1 Sep. 12, 2002

(51) Int. Cl.$^7$ ................................................ A47C 21/00
(52) U.S. Cl. ................................................ 5/421; 5/654
(58) Field of Search ...................... 5/421, 654, 655.5, 5/644, 284; 607/104, 96; 237/71

(56) References Cited

U.S. PATENT DOCUMENTS

| | | | | |
|---|---|---|---|---|
| 5,448,788 A | * | 9/1995 | Wu | 5/421 |
| 5,500,007 A | * | 3/1996 | Kim et al. | 5/421 |
| 5,871,151 A | * | 2/1999 | Fiedrich | 237/69 |
| 5,894,615 A | * | 4/1999 | Alexander | 165/46 |

* cited by examiner

*Primary Examiner*—Teri Pham Luu
*Assistant Examiner*—Fredrick Conley

(57) ABSTRACT

A heating system, e.g. for a bed mattress or floor sleeping area, has a tube extending in an array from a water inlet portion to a water outlet portion through a sinuous intermediate portion. The heating system has a longitudinal inner area extending centrally along the array and a pair of longitudinal outer areas extending at opposite sides of the inner area along the array. The intermediate portion has innermost runs distributed over the central area, where a sleeping person is most likely to lie, and connected directly to the inlet portion and to one another and outermost runs distributed over the outer areas and connected directly to the water outlet portion and to one another. A pump has an outlet connected through the water heater to the water inlet portion and an inlet connected to a water reservoir; and a water temperature and flow control device is connected to the pump and the water heater.

6 Claims, 4 Drawing Sheets

BED HEATING SYSTEMS

BACKGROUND OF THE INVENTION

1. Field of the Invention

The present invention relates to bed heating systems and is useful in particular, but not exclusively, for heating beds and floors in domestic and hospital situations.

2. Description of the Related Art

Various bed heating systems have previously been proposed, but most of such prior systems employ electrical heating elements embedded in a mattress or a blanket, which gives rise to various problems.

For example, when a person lies on such a prior art bed, the body of that person is subjected to electrical noise from the heater element. Also, the heater element consumes a large quantity of electrical power.

BRIEF SUMMARY OF THE INVENTION

It is accordingly an object of the present invention to provide a novel and improved heating system which avoids subjecting users to electrical noise and which operates so efficiently as to require little electrical power.

According to the present invention, there is provided a heating system comprising a tube extending in an array which has a water inlet portion, a water outlet portion and a sinuous intermediate portion between the water inlet and outlet portions. The heating system has a longitudinal inner area, extending centrally along the tube array, and a pair of longitudinal outer areas extending at opposite sides of the inner area. The intermediate portion of the tube has innermost runs distributed over the central area and connected directly to the inlet portion and to one another and outermost runs distributed over the outer areas and connected directly to the water outlet portion and to one another. A pump has an outlet connected through a water heater to the water inlet portion and an inlet connected to a water reservoir for supplying heated water to the tube.

With this arrangement, the newly heated water, arriving at the tube from the water heater, flows firstly through the longitudinal inner area, which is where a person using the tube array is usually positioned. From this inner area, the water, as it becomes cooler, flows along the outer areas of the array. Thus, the heat supplied to the tube by the water is mostly concentrated in the inner area, where it is of the greatest use.

In a preferred embodiment of the invention, the water reservoir comprises a water tank having a tank inlet connected to the water outlet portion of the tube, a tank outlet communicating with the interior of the tank and connected to the pump inlet and a water duct connected to the tank inlet, the water duct having a duct outlet arranged to discharge directly into the tank outlet.

By this means, water passing from the tube into the tank, which will contain residual heat from its previous heating by the water heater before it entered the tube, passes directly to the tank outlet and, thus, back to the water pump so that the residual heat in this water is, to at least a substantial extent, retained in the water and not lost to any cooler supply of water remaining in the tank.

The water heater is preferably a cylindrical water heater contained in a cylindrical housing, which defines a cylindrical water heating passage between the housing and the water heater, the pump having an outlet connected through the water heating passage to the water inlet portion of the tube. Consequently, the water to be heated, as it passes through the cylindrical water heating passage, is brought into close proximity with the water heater, thus promoting efficient heating of this water.

The tube array may be provided in a mattress pad or may be installed in a floor or other sleeping area without a mattress pad.

BRIEF DESCRIPTION OF THE DRAWINGS

The invention will be more readily understood from the following description of a preferred embodiment thereof given, by way of example, with reference to the accompanying drawings, in which.

DESCRIPTION OF THE PREFERRED EMBODIMENT

Figure 1:
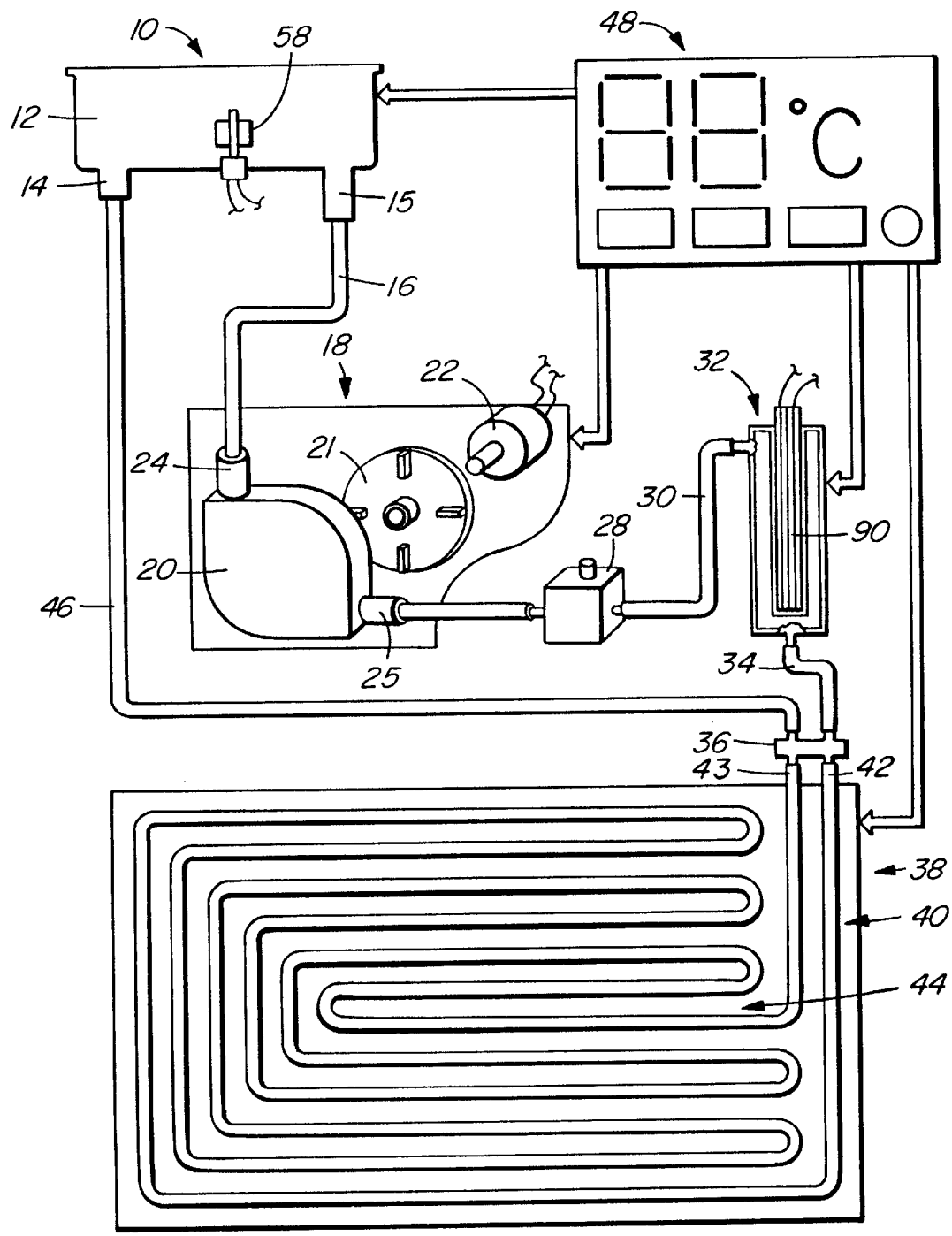
FIG. 1 shows a diagrammatic illustration of a heating system embodying the present invention.

Referring firstly to FIG. 1 of the accompanying drawings, reference numeral 10 indicates generally a water reservoir comprising a tank 12 (FIG. 7) having a tank inlet 14 and a tank outlet 15.

The tank outlet 15 is connected by a tube 16 to a pump unit indicated generally by reference numeral 18, which includes a pump 20 having a rotor 21 and an electrical motor 22 for driving the pump 20.

The pump 20 has a pump inlet 24 and a pump outlet 25, and the pump outlet 25 is connected to an air valve 28 through which air can be extracted for priming the pump 20.

The air valve 28 is connected through a pipe 30 to a water heater unit indicated generally by reference numeral 32.

Through a pipe 34 and a rotary valve 36, the water heater unit 32 is connected to a mattress pad indicated generally by reference numeral 38.

Figure 3:
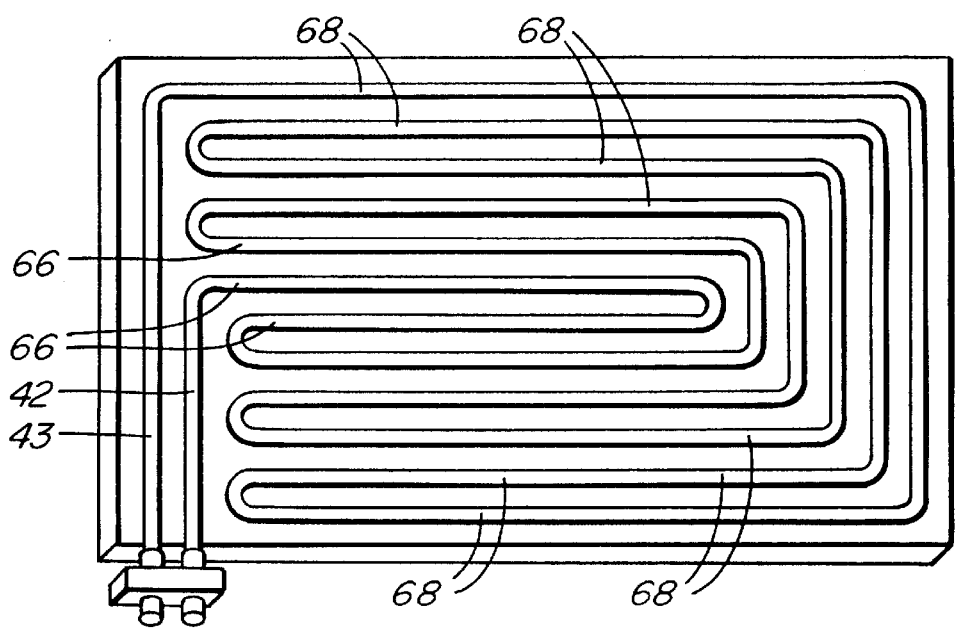
FIG. 3 shows a diagrammatic plan view taken in horizontal cross-section through a mattress pad forming part of the heating system of FIG. 1.

More particularly, the mattress pad 38 contains a tube indicated generally by reference numeral 40 which, as shown in FIG. 3, has an inlet portion 42, an outlet portion 43 and a sinuous intermediate portion 44 interconnecting the inlet and outlet portions 42 and 43, and the valve 36 is operable to connect the pipe 34 to the inlet portion 42 and to connect the outlet portion 43 to a pipe 46 which, in turn, is connected to the tank inlet 14.

Figure 2:
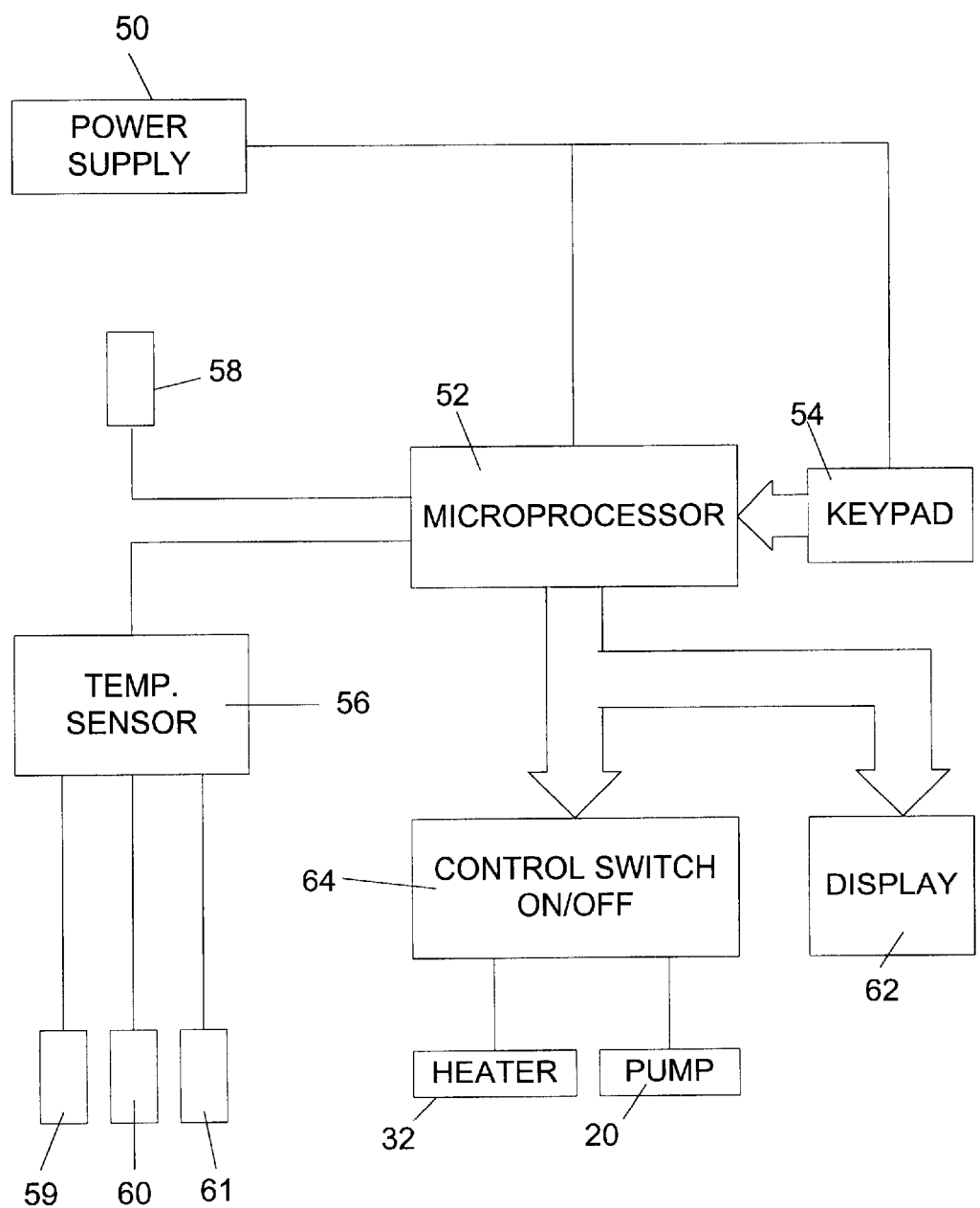
FIG. 2 shows a block diagram of a control device forming part of the system of FIG. 1.

The bed heating system is controlled by a water temperature and flow control device indicated generally by reference numeral 48, the components of which are diagrammatically illustrated in the block diagram of FIG. 2.

As shown in FIG. 2, a power supply 50 is connected to a microprocessor 52 and a keypad 54 for inputting instructions into the microprocessor 52. A temperature sensor unit 56 is connected to receive information from temperature probes 58, 59, 60 and 61 and to output corresponding information to the microprocessor.

The temperature probe 58 is provided in the tank 14. The temperature probes 59 and 60 sense the temperature of the water leaving the mattress pad 38 and at the water heater 28, respectively. The temperature probe 61 is provided in the control device 48 for initiating an emergency alarm if the temperature in the control device exceeds a safe value.

The microprocessor 48 controls a display 62 for indicating the temperature in the mattress pad 38 and also actuates control switches 64 for switching on and off the heater 28 and the pump 20.

Referring again to FIG. 3, which illustrates the sinuous array of the intermediate portion 44 of the tube 40 in the mattress pad 38. it will be seen that, at a longitudinally central area of the mattress pad, the sinuous intermediate portion 44 has inner runs, indicated generally by reference numeral 66, which extend longitudinally along the central portion of the mattress pad 38. These inner runs 66 interconnect the inlet portion 42 to outer runs 68 of the tube 40, which extend longitudinally along outer areas of the mattress pad 38 at opposite sides of the central area. The runs 68, in turn, are connected to the outlet portion 43 of the tube 40. The runs 66 are connected through the runs 68 to the outlet portion 43.

The purpose of this arrangement is to ensure that newly heated water, arriving from the water heater unit 32 through the inlet portion 42 of the tube 40 through the inner runs 66, is directed firstly along the central area of the mattress pad 38, which is where a person using the mattress pad 38 is most likely to be positioned. From this central area, the water, becoming cooler, passes into the outer runs 68 at the outer areas of the mattress pad 38 and, from there, to the water outlet portion 43 of the tube 40. In this way, it is ensured that the majority of the heat from the water introduced into the mattress pad 38, and which is given off from the tube 40, is concentrated at the central longitudinal area of the mattress pad 38, thus promoting efficient utilization of this heat.

Figure 4:
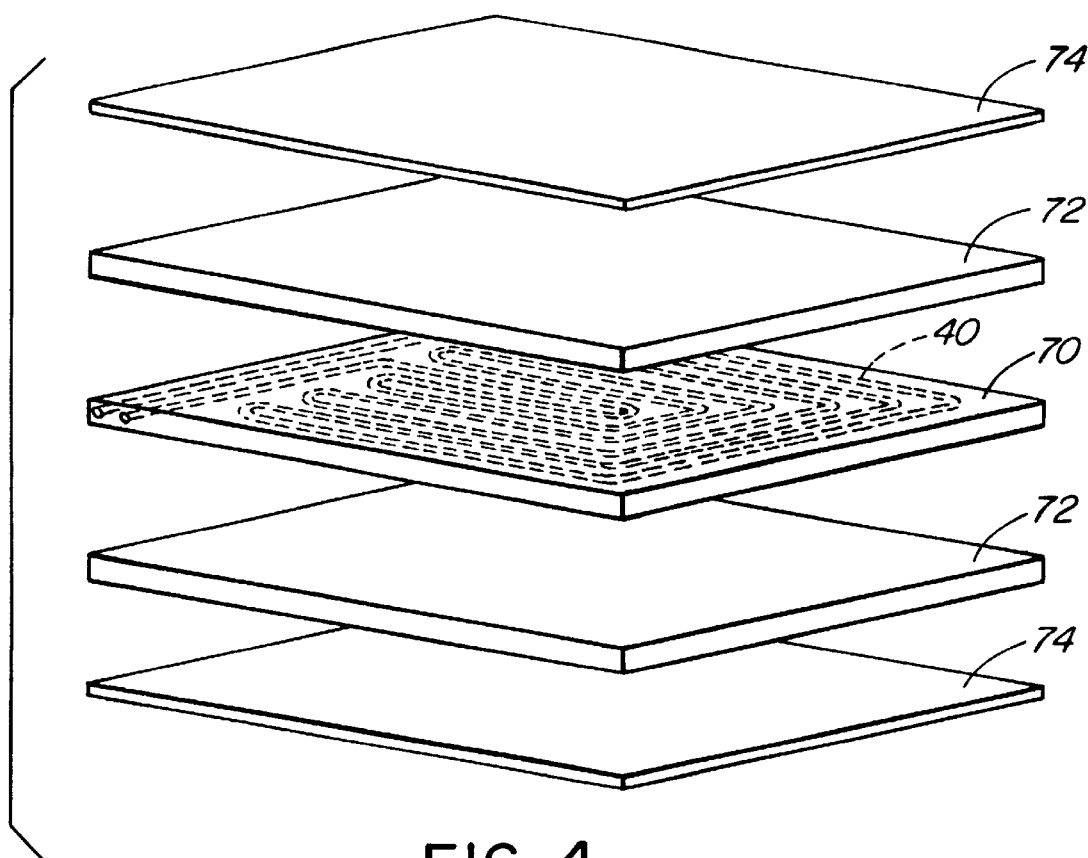
FIG. 4 shows an exploded view, in perspective, of components of the mattress pad of the heating system of FIG. 1.

As shown in FIG. 4, the tube 40 is embedded in a flexible pad 70, which is sandwiched between two layers 72 of soft foam material, which serve to pad the tube 40, and these layers 72 are contained in a fabric envelope comprising upper and lower sheets 74 of fabric material, which are connected to one another by stitching (not shown), to form the mattress pad 38.

Figure 5:
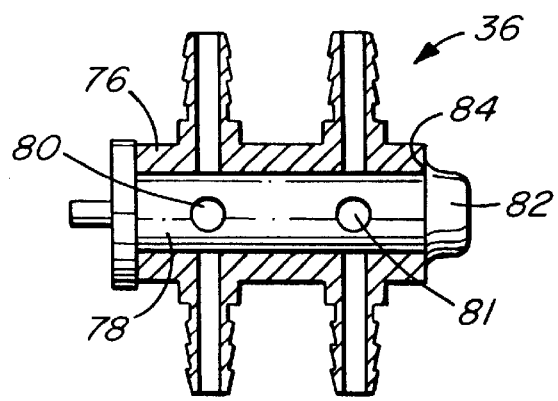
FIG. 5 shows a diagrammatic view, in horizontal cross-section, through an on/off valve forming part of the heating system of FIG. 1.

FIG. 5 illustrates in greater detail the rotary valve 36, which comprises a valve housing 76 containing a cylindrical rotary valve member 78 provided with two through openings 80 and 81. A rubber cap 82, provided at one end of the valve member 78, has a rim 84 having a diameter slightly greater than that of the valve member 78, so that this rim 84 makes sealing engagement with one end of the housing 76 on insertion of the valve member 78 through the housing 76 into the position in which it is shown in FIG. 5.

Figure 6:
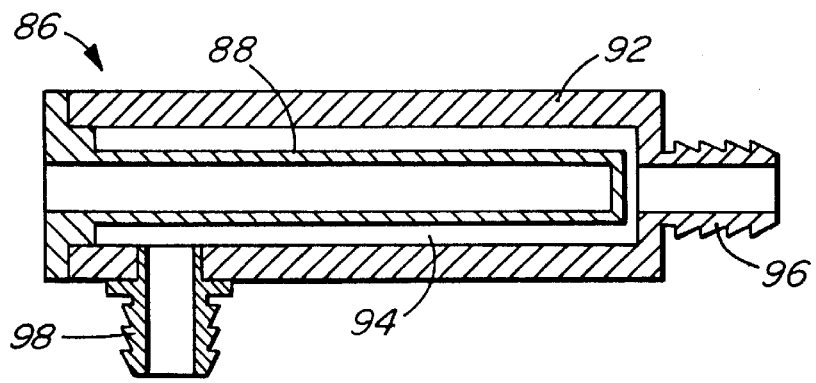
FIG. 6 shows a view in vertical cross-section through a heater unit forming part of the heating system of FIG. 1.

FIG. 6 illustrates a housing assembly, indicated generally by reference numeral 86, forming part of the water heater unit 32 of FIG. 1.

As shown in FIG. 6, the water heater housing assembly comprises an inner housing 88, which is open at one end for receiving a cylindrical heater cartridge 90 shown in FIG. 1 and, for clarity, omitted from FIG. 6. An outer housing 92 extends around the inner housing 88 at a spacing from the inner housing 88 so as to form therebetween a water flow passage 94 extending longitudinally of the inner housing 88, and thus of the water heater cartridge 90, from a passage inlet 96 to a passage outlet 98.

Figure 7:
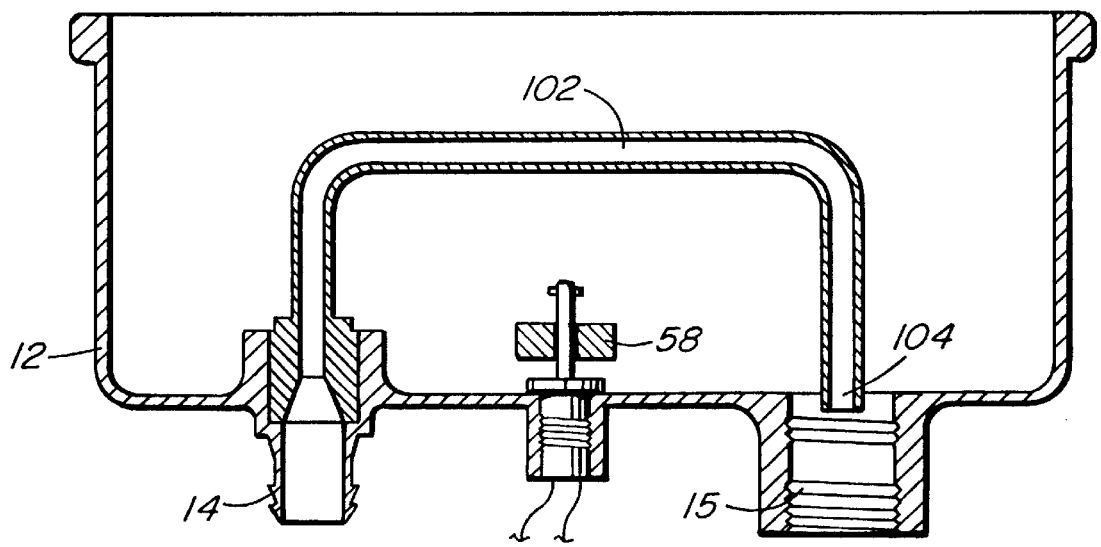
FIG. 7 shows a view taken in vertical cross-section through a water reservoir forming part of the heating system of FIG. 1.

The tank 12 is shown in greater detail in FIG. 7.

A water duct 102 is connected at one of its ends to the tank inlet 14 in such a manner that all of the water entering the tank through the tank inlet 14 must flow through the water duct 102.

The opposite end of the duct 102, which is indicated by reference numeral 104, is located at the top of the tank outlet 15, so as to discharge directly into the tank outlet 15, but is spaced radially from the top of the tank outlet 15 so as also to allow water to flow from a supply 106 of water in the tank 12, at the exterior of the water duct 102, through the tank outlet 15.

The duct 102 is connected to the tank inlet 14 so that water flowing through the rotary valve 36 from the outlet portion 43 of the tube 40, and containing residual heat, does not become mixed with the supply 106 of water in the tank 12 but, instead, flows along the duct 102 so as to be discharged directly into the tank outlet 15. At least a portion of the residual heat in this flow of water is, thus, retained and re-circulated through the pump 20.

The above-described bed heating system has the advantage that it is very energy-efficient, because of the above-described constructions of the mattress pad 38, the water heater unit 32 and the tank 12. Consequently, by use of a suitable commercially available heater cartridge as the heater cartridge 90, an electrical power of only 10 W is sufficient.

Furthermore, the components of the above-described heating system, and in particular the control device 48, can be made very compactly, to facilitate packaging, storage and transportation of the system.

Instead of being incorporated in the mattress pad 38 as described above, the tube 40 may alternatively be installed in a floor, e.g. at a sleeping area of the floor, for providing heat to a person sleeping on the floor, as is customary in Asia.

As will be apparent to those skilled in the art, various modifications may be made in the above-described embodiment of the invention within the scope of the appended claims.

I claim:

1. A heating system, comprising a mattress pad of flexible material;

a tube;

said tube extending in an array including a water inlet portion, a water outlet portion and a sinuous intermediate portion between said water inlet and outlet portions;

a water heater; a water reservoir separate from said water heater;

a pump;

said pump having an outlet connected through said water heater to said water inlet portion and an inlet connected to said water reservoir;

said heating system having a longitudinal inner area extending centrally along said array and a pair of longitudinal outer areas extending at opposite sides of said inner area along said array;

said intermediate portion having innermost runs distributed over said central area and outermost runs distributed over said outer areas, said innermost runs being connected directly to said inlet portion and to one another and through said outermost runs to said water outlet portion and said one another;

said water reservoir comprising a tank, and said tank having a tank inlet connected to said outlet portion of said array and a tank outlet connected to said inlet of said pump; and a duct within said water reservoir;

said duct having one end connected to said tank inlet and an opposite end located at said tank outlet to discharge water from said duct directly into said tank outlet and spaced radially from said tank oulet to allow water to flow into said tank outlet from a supply of water in said tank and a water temperature and flow control device connected to said pump and said water heater.

2. A heating system as claimed in claim 1, wherein said water heater comprises a housing assembly comprising an inner housing and an outer housing containing said inner housing, said inner and outer housings forming therebetween a water flow passage, and a heater cartridge in said inner housing.

3. A heating system as claimed in claim 2, wherein said water temperature and flow control device includes temperature sensing means for sensing the temperature of water leaving said mattress pad and at said heater, control switch means for controlling said pump and said heater and microprocessor means connected to said temperature sensing means and said control switch means for operating said control switch means.

4. A heating system as claimed in claim 3, further comprising a keyboard connected to said microprocessor means for inputting instructions to said microprocessor means.

5. A heating system as claims in claim 3, wherein said temperature sensing means includes temperature sensor means in said water temperature and flow control device for initiating an alarm if the temperature in said water temperature and flow control device exceeds a safe value.

6. A heating system as claimed in claim 3, further comprising a display device controlled by said microprocessor for indicating the temperature in said mattress pad.

* * * * *